(12) United States Patent
Jeong et al.

(10) Patent No.: US 9,728,150 B2
(45) Date of Patent: Aug. 8, 2017

(54) DISPLAY PANEL AND DISPLAY DEVICE

(71) Applicant: SAMSUNG DISPLAY CO., LTD., Yongin, Gyeonggi-do (KR)

(72) Inventors: Jun Ki Jeong, Anyang-si (KR); Kwang Chul Jung, Seongnam-si (KR); Il Gon Kim, Seoul (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 42 days.

(21) Appl. No.: 14/690,130

(22) Filed: Apr. 17, 2015

(65) Prior Publication Data

US 2016/0163633 A1    Jun. 9, 2016

(30) Foreign Application Priority Data

Dec. 9, 2014 (KR) .................. 10-2014-0175766

(51) Int. Cl.
*G09G 5/00* (2006.01)
*G09G 3/36* (2006.01)
*G02F 1/1362* (2006.01)

(52) U.S. Cl.
CPC ..... *G09G 3/3666* (2013.01); *G02F 1/136286* (2013.01); *G09G 2300/0408* (2013.01); *G09G 2300/0426* (2013.01); *G09G 2310/0278* (2013.01); *G09G 2310/0281* (2013.01); *G09G 2360/12* (2013.01)

(58) Field of Classification Search
CPC ......... G09G 2300/0426; G09G 3/3648; G09G 2320/043; G09G 3/3225; G09G 2300/0876; G09G 3/3659; G09G 2300/0408; G09G 2310/0281; G09G 3/3266; G09G 3/3275; G09G 2310/0262; G09G 2300/0417; G09G 2300/046; G09G 2310/0278; G09G 3/3666; G02F 1/136286; G02F 1/134309; G02F 2001/134318; G02F 2001/133757
USPC ...................................... 345/76–89
See application file for complete search history.

(56) References Cited

U.S. PATENT DOCUMENTS

| | | | |
|---|---|---|---|
| 7,567,231 B2 * | 7/2009 | Takahashi | G02F 1/1345 345/100 |
| 2008/0018557 A1 * | 1/2008 | Maeda | G02F 1/167 345/55 |
| 2013/0307758 A1 * | 11/2013 | Kim | G09G 3/22 345/55 |

FOREIGN PATENT DOCUMENTS

| | | |
|---|---|---|
| KR | 100739284 | 7/2007 |
| KR | 1020140008211 | 1/2014 |
| KR | 1020150107943 | 9/2015 |

* cited by examiner

*Primary Examiner* — Duc Dinh
(74) *Attorney, Agent, or Firm* — F. Chau & Associates, LLC

(57) ABSTRACT

A display panel includes a display unit with a first area and a second area, first gate lines on the first area and the second area that extend in a first direction in the first area and in a third direction in the second area, while sections extending in the first direction and in a second direction are repeated, and second gate lines on the second area that extend in the third direction while sections extending in the first direction and in the second direction are repeated. The second gate line includes a plurality of sub gate lines that extend in the second direction in the second area, and one end of each of the plurality of sub gate lines is connected to one end of each of the plurality of second gate lines.

19 Claims, 18 Drawing Sheets

DISPLAY PANEL AND DISPLAY DEVICE

CROSS-REFERENCE TO RELATED APPLICATION

This application claims priority under 35 U.S.C. 119 from Korean Patent Application No. 10-2014-0175766 filed on Dec. 9, 2014 in the Korean Intellectual Property Office, and all the benefits accruing therefrom, the contents of which are herein incorporated by reference in their entirety.

TECHNICAL FIELD

Embodiments of the present disclosure are directed to a display panel and a display device with a guaranteed display quality.

BACKGROUND

The importance of a display device has increased with the development of multimedia. In this respect, various types of display devices, such as a liquid crystal display (LCD) and an organic electroluminescent display device, have been used.

An LCD is a device for applying an electric field to a liquid crystal material having dielectric anisotropy, which is injected between two substrates, and adjusting the amount of light passing through the substrate from an external light source by adjusting an intensity of the electric field to obtain a desired image signal.

In general, an organic electroluminescent display device, which is a display device for emitting light by electrically exciting a fluorescent organic compound, may display an image by voltage programming or current programming a plurality of organic light emitting diodes (OLEDs) arranged in a matrix form. Methods of driving an organic electroluminescent display device include a passive matrix method and an active matrix method that uses a thin film transistor. While the passive matrix uses an anode and cathode orthogonal to each other and selects a line to drive the organic electroluminescent display device, the active matrix method connects a thin film transistor to each indium tin oxide (ITO) pixel electrode, and drives the organic electroluminescent display device using a voltage maintained by a capacitor capacity connected to a gate of the thin film transistor.

The aforementioned display devices generally include horizontally disposed gate lines and vertically disposed data lines in a display panel, and pixels are disposed in areas where the gate lines and the data lines cross and form a matrix array.

SUMMARY

Embodiments of the present disclosure can provide a display panel in which an embedding area of a gate driver is minimized.

Embodiments of the present disclosure can provide a display panel in which a luminance deviation is prevented from being generated.

Embodiments of the present disclosure can also provide a display device in which an embedding area of a gate driver is minimized.

Embodiments of the present disclosure can also provide a display device in which a luminance deviation is prevented from being generated.

According to embodiments of the present disclosure, in a display panel and a display device including the same, an embedding area of the gate driver may be minimized.

According to embodiments of the present disclosure, in a display panel and a display device including the same, luminance deviation may be prevented from being generated.

Exemplary embodiments of the present disclosure provide a display panel that includes a display unit including a first area and a second area; first gate lines formed over the first area and the second area that extend in a first direction in the first area and extend in a third direction in the second area, while sections thereof extending in the first direction and sections thereof extending in a second direction are repeated; and second gate lines formed over the second area that extend in the third direction while sections thereof extending in the first direction and sections thereof extending in the second direction are repeated. The second gate line includes a plurality of sub gate lines that extend in the second direction in the second area, and one end of each of the plurality of sub gate lines is connected to one end of each of the plurality of second gate lines.

Exemplary embodiments of the present disclosure also provide a display device that includes a first area and a second area; data lines formed in the first area and the second area that extend in a second direction; first gate lines formed over the first area and the second area that extend in a first direction in the first area, and extend in a third direction in the second area while sections thereof extending in the first direction and sections thereof extending in the second direction are repeated; second gate lines formed over the second area that extend in the third direction while sections thereof extending in the first direction and sections thereof extending in the second direction are repeated; a display unit that includes a plurality of pixels disposed where the data lines and the first gate lines cross, and where the data lines and the second gate lines cross; a data driver configured to provide a data signal to the plurality of data lines; a gate driver configured to provide a gate signal to the plurality of first gate lines and the plurality of second gate lines; and a signal controller configured to control the data driver and the gate driver.

DETAILED DESCRIPTION OF EXEMPLARY EMBODIMENTS

Figure 1:
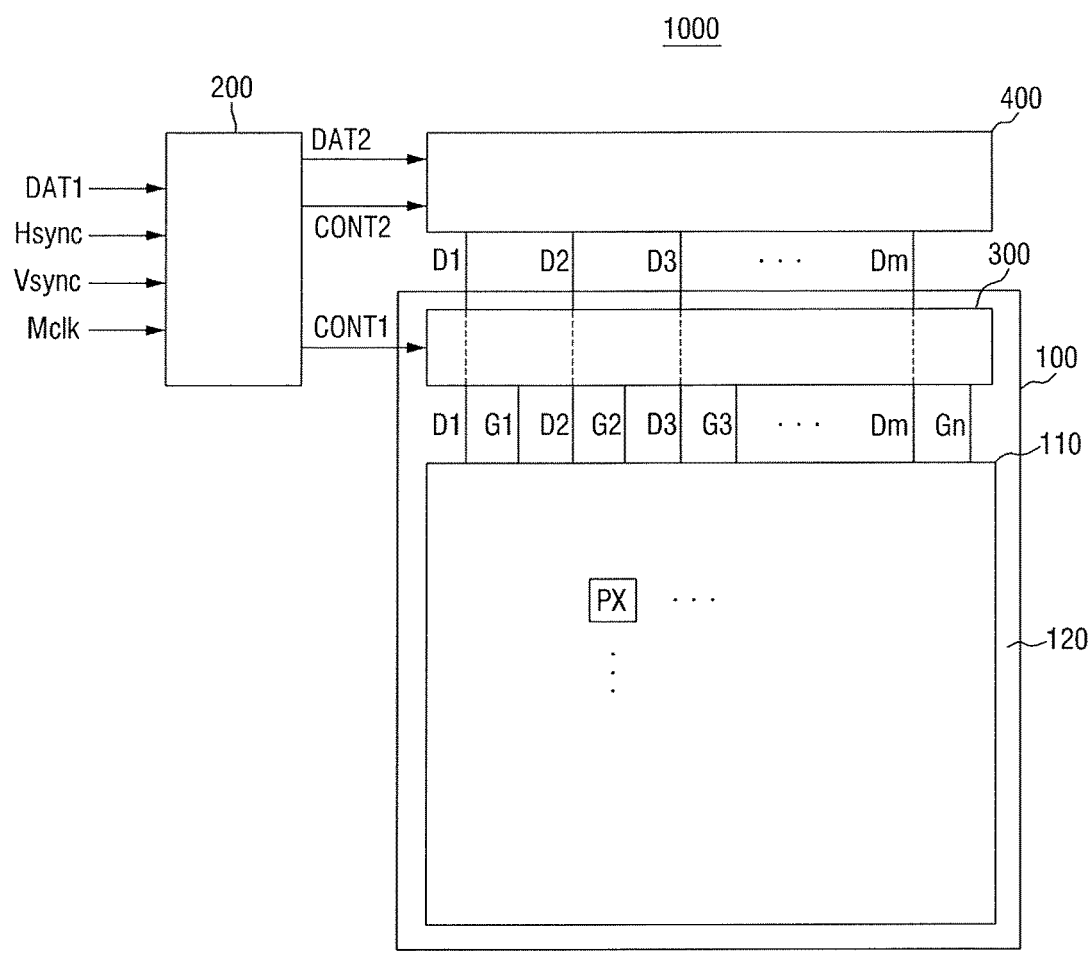
FIG. 1 is a schematic diagram of a display device according to an embodiment of the present disclosure.

Features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Like reference numerals may refer to like elements throughout the specification.

It will be understood that when an element or layer is referred to as being "on", "connected to" or "coupled to" another element or layer, it can be directly on, connected or coupled to the other element or layer or intervening elements or layers may be present.

FIG. 1 is a schematic diagram of a display device according to an embodiment of the present disclosure.

Referring to FIG. 1, a display device 1000 may include a display panel 100, a signal controller 200, a gate driver 300, and a data driver 400.

The display panel 100 may be divided into a display unit 110 in which an image is displayed, and a non-display unit 120 in which no image is displayed.

The display unit 110 may include a plurality of gate lines G1 to Gn, a plurality of data lines D1 to Dm, and a plurality of pixels PXs. Each of the plurality of gate lines G1 to Gn may transmit a gate signal, and each of the plurality of data lines D1 to Dm may transmit a data signal. One pixel PX may be generated at each crossing of the plurality of gate lines G1 to Gn and the plurality of data lines D1 to Dm. In this case, when a pixel PX is a current programming pixel, a data signal may be a current, and when a pixel PX is a voltage programming pixel, a data signal may be a voltage. A disposition of the plurality of gate lines G1 to Gn and the plurality of data lines D1 to Dm on the display unit 110 will be described in detail below with reference to FIG. 2.

In addition, to display a color, each pixel PX uniquely displays one of the primary colors or alternately displays the primary colors over time, so that a desired color may be recognized by a spatial or temporal sum of the primary colors. Examples of the primary colors include red, green, and blue. In this case, when the pixel PX displays a color with a temporal sum, red, green, and blue may be alternately displayed temporally in one pixel PX to realize a color. Alternatively, when the pixel PX displays a color with a spatial sum, a red pixel, a green pixel, and a blue pixel may be alternately arranged in a row direction or a column direction, or the three pixels may be arranged at positions corresponding to three vertices of a triangle.

The signal controller 200 may receive various externally supplied signals to control the gate driver 300 and the data driver 400. In particular, the signal controller 200 may receive an externally supplied first image data DAT1 and control signals to control a display of the first image data DAT1, and output a gate driver control signal CONT1, a data driver control signal CONT2, second image data DAT2, etc.

The first image data DAT1 may contain luminance information for each pixel PX of the display unit 110, and luminance may have a predetermined number of gray levels. For example, the luminance may have 1024 ($=2^{10}$) gray levels, 256 ($=2^8$) gray levels, or 64 ($=2^6$) gray levels, but is not limited thereto, and may have a different number of gray levels.

Examples of the input control signal received by the signal controller 200 include a vertical synchronization signal Vsync, a horizontal synchronization signal Hsync, a main clock Mclk, etc., but the input control signals are not limited thereto, and different types of signals may be further received.

The gate driver control signal CONT1 may control the gate driver 300, and is generated by the signal controller 200 and transmitted to the gate driver 300. The gate driver control signal CONT1 may include a scan initiation signal, a clock signal, etc., but is not limited thereto, and may further include other signals.

The data driver control signal CONT2 may control the data driver 400, which is generated by the signal controller 200 and is transmitted to the data driver 400.

The signal controller 200 may process the first image data DAT1 in accordance with operating conditions of the data driver 400 based on the input control signal. In particular, the signal controller 200 may generate second image data DAT2 by processing the first image data DAT1, and outputting the generated second image data DAT2. The processing may include luminance compensation and other processes.

The gate driver 300 may be connected to the display unit 110 through the plurality of gate lines. The gate driver 300 may generate a plurality of gate signals, which can activate each pixel of the display unit 110, according to the gate driver control signal CONT1, and transmit the generated gate signals to the corresponding gate line of the plurality of gate lines G1 to Gn.

FIG. 1 shows that the gate driver 300 may be directly formed on the non-display unit 120, but the gate driver 300 is not limited thereto, and may be embedded in the non-display unit 120 through a contact pad as an integrated circuit (IC), or connected to the display panel 100 in the form of a tape carrier package (TCP).

The data driver 400 and the gate driver 300 may be embedded in the non-display unit 120 through a contact pad as an IC, or connected to the display panel 100 in the form of a TCP.

In addition, the gate driver 300 and the data driver 400 may be disposed in an area outside of one corner of the display unit 110. When the gate driver 300 and the data driver 400 are disposed outside of one corner of the display unit 110, a separate area for embedding the gate driver 300 or the data driver 400 is not needed outside the remaining corners of the display unit 110, so that it is possible to decrease an area of the non-display unit 120. A disposition of the gate lines G1 to Gn and the data lines D1 to Dm of the display unit 110 will be described in detail with reference to FIG. 2.

Figure 2:
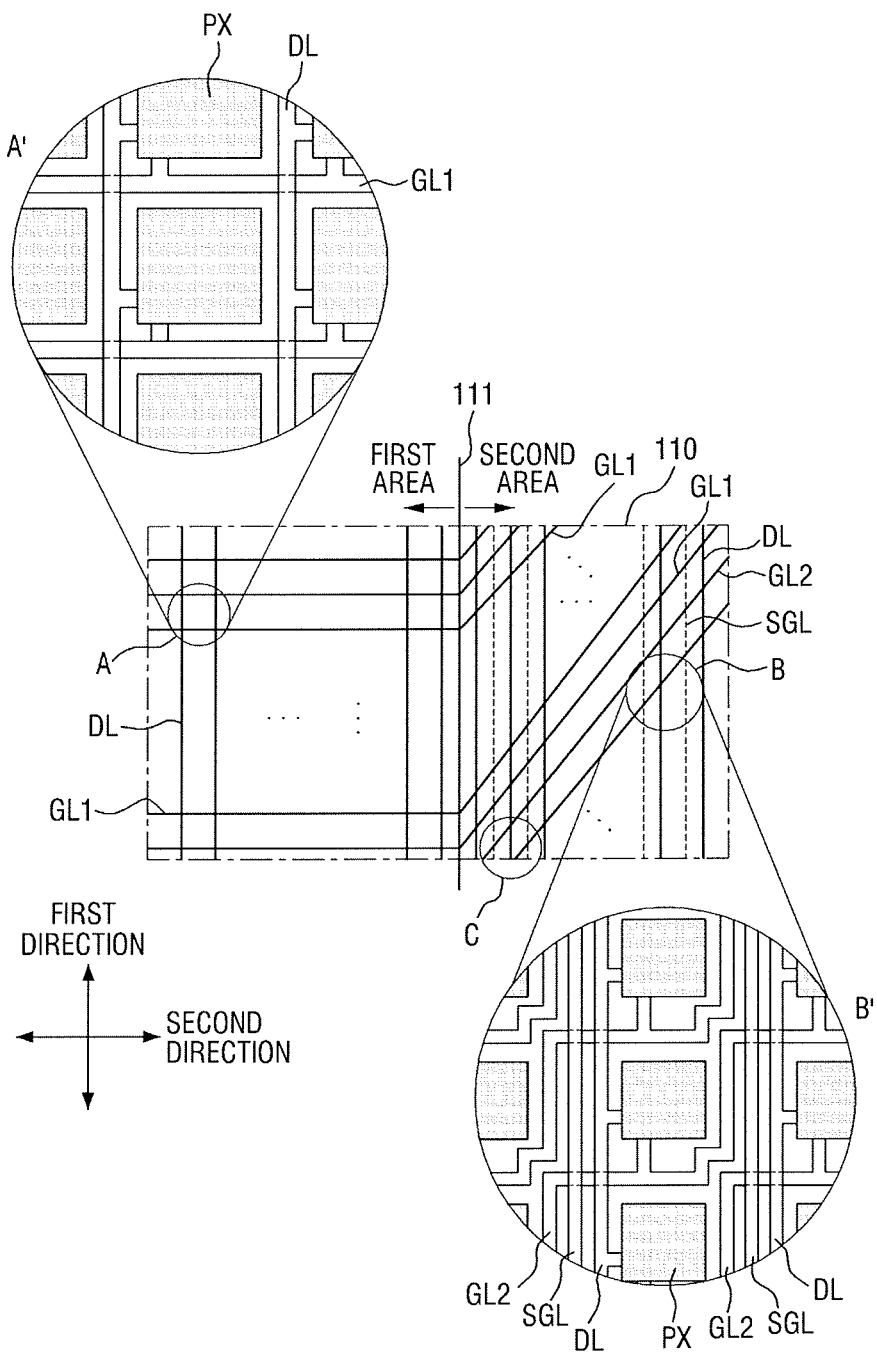
FIG. 2 is a schematic diagram of a display unit according to an embodiment of the present disclosure.

FIG. 2 is a schematic diagram of a display unit according to an embodiment of the present disclosure.

Referring to FIG. 2, the display unit 110 may be divided into a first area and a second area. Further, the display unit 110 may include first gate lines GL1, second gate lines GL2, sub gate lines SGL, data lines DL, and pixels PX.

The first area and the second area may be divided based on a predetermined area boundary line 111 on the display unit 110. The area boundary line 111 is illustrated in the form of a straight line, but is not limited thereto, and the area boundary line 111 may be a curved line and may connected piece-wise linear line. Further, while the area boundary line 111 is shown as bisecting the display unit 110, the area boundary line 111 is not limited thereto, as the area of the first area and the area of the second area may have a predetermined ratio.

The data lines DL may extend in a first direction in the first area and the second area, respectively. The data lines may be formed in the first area and the second area at a predetermined interval.

The data lines D1 to Dm may be connected with the pixels PXs and provide a signal received from the data driver 400 to the pixels PX. The data signal may be provided through an upper corner of the display unit 110 illustrated in FIG. 2.

The first gate line GL1 and the second gate line GL2 may provide a gate signal received from the gate driver 300 to the pixels PX. However, the disposition of the first gate line GL1 and the second gate line GL2 on the display unit 110 may be different as described below.

The first gate line GL1 may be formed over the first area and the second area. The first gate line GL1 may extend in a second direction in the first area, and generally extend in a third direction in the second area. The second direction may be perpendicular to the first direction, and the third direction may be inclined with respect to the first direction and the second direction. In particular, the first gate line in the second area may generally extend in the third direction while a section thereof extending in the first direction and another section thereof extending in the second direction are repeatedly connected. This will be particularly described in a description of C', an enlarged partial area C of the second area, together with the sub gate line SGL and the second gate line GL2.

Referring to A', an enlarged area A of the first area, the pixel PX may be disposed in an area in which the data line extending in the first direction crosses the first gate line GL1 extending in the second direction. Further, the data line DL and the first gate line GL1 may be connected to the pixel PX to provide the data signal and the gate signal, respectively.

The gate signal provided to the first gate line GL1 may be provided through an upper corner of the display unit 110 illustrated in FIG. 2. As described above, the data signal may also be provided through an upper corner of the display unit 110, so that it is not necessary to dispose other components, such as a separate line, the gate driver 300, or the data driver 400 outside the remaining corners of the display unit 110, thereby decreasing an area of the non-display unit 120.

However if the gate signal is provided through the upper corner of the display unit 110, the gate signal may be provided to all areas of the first area and to the left upper area of the second area, through which the first gate line GL1 passes, but a gate signal is needed through a left lower area of the second area through which no first gate line passes, and to this end, the sub gate line SGL and the second gate line GL2 may be formed.

The second gate line GL2 may be formed in an area of the second area, through which no first gate line GL1 may pass. The second gate line GL2 may generally extend in the third direction. In particular, the second gate line GL2 may generally extend in the third direction while a section thereof extending in the first direction and a section thereof extending in the second direction are repeatedly connected.

To transmit the gate signal received through the upper corner of the display unit 110 to the second gate line GL2, the sub gate line SGL may be formed. The sub gate lines SGL may extend in the first direction in the second area, and be separated by a predetermined interval based on a separation interval of the second gate lines GL2. One end of the sub gate line SGL may be electrically connected with one end of the second gate line GL2. Accordingly, the sub gate line SGL may provide the received gate signal to the second gate line GL2.

In particular, referring to enlarged area B' of area B of the second area, the data line DL may extend in the first direction. The sub gate line SGL may extend in the first direction, and the second gate line may generally extend in the third direction while a section thereof extending in the first direction and a section thereof extending in the second direction are repeatedly connected. The sub gate line SGL may be disposed parallel to the data line DL, but, unlike to the data line DL, may not be directly connected with the pixel PX. The pixel PX may be disposed in an area in which the data line DL and the second gate line GL2 cross, and each pixel PX may receive a data signal through the data line DL and a gate signal through the second gate line GL2.

In addition, a point at which a resistance of adjacent first gate lines GL1 and a resistance of the second gate line GL2 and the sub gate line SGL are equal may be set as the area boundary line 111. When the resistance of the adjacent first gate lines GL1 equals the resistance of the second gate line GL2 and the sub gate line SGL, no luminance deviation is generated for each area of an image displayed on the display unit 110. Alternatively, if there is a resistance difference, a point at which a total length of the adjacent first gate lines GL1 and a total length of the second gate line GL2 and the sub gate line SGL are equal may be set as the area boundary line 111. A detailed description of a method for determining the area boundary line 111 will be described below with reference to FIGS. 6 to 12.

A connection structure of the second gate line GL2, the sub gate line SGL, and the data line DL, and an interlayer structure will be described in detail with reference to FIGS. 3 and 4.

Figure 3:
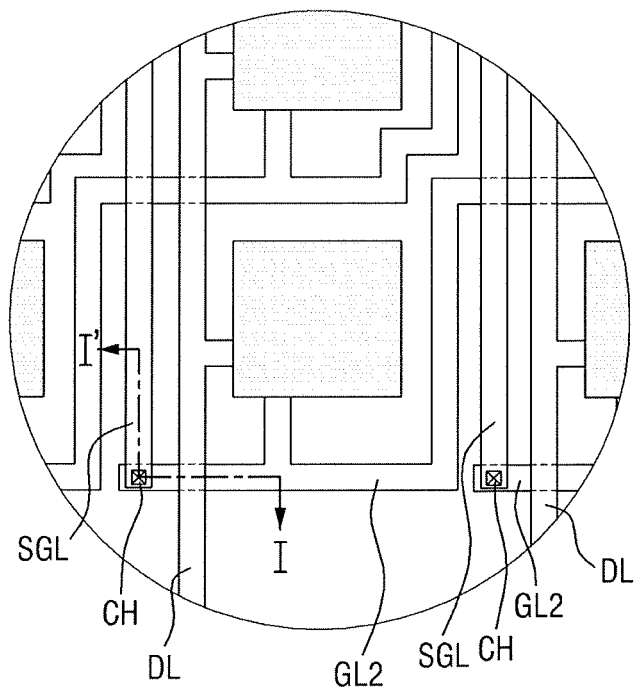
FIG. 3 is an enlarged top plan view of area C of FIG. 2.

FIG. 3 is an enlarged top plan view of area C of FIG. 2. Area C of FIG. 2 is part of a lower part of the second area of the display unit in which the second gate line is electrically connected with the sub gate line.

Referring to FIG. 3, the sub gate line SGL and the second gate line GL2 may be electrically connected through a contact hole CH. The sub gate line SGL may provide the received gate signal to the second gate line GL2 through the contact hole.

Figure 4:
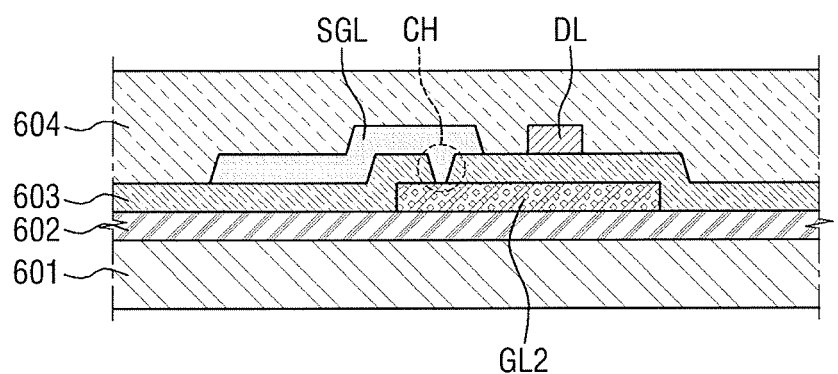
FIG. 4 is a cross-sectional view of a section I-I' of FIG. 3.

FIG. 4 is a cross-sectional view of a section I-I' of FIG. 3.

Referring to FIG. 4, the second gate line GL2, the sub gate line SGL, and the data line DL may be formed on a substrate 601. A first insulation layer 602 that protects the substrate 601 and various lines generated thereon may be formed on the substrate 601. The second gate line GL2 may be formed on the first insulation layer 602, and the second gate line GL2 and the data line DL may be spaced apart and electrically insulated from each other by a second insulation layer 603 interposed therebetween. The second gate line GL2 and the sub gate line SGL may be spaced apart from each other by the second insulation layer 603 interposed therebetween, but may be electrically connected through the contact hole CH that passes through the second insulation layer 603.

Figure 5:
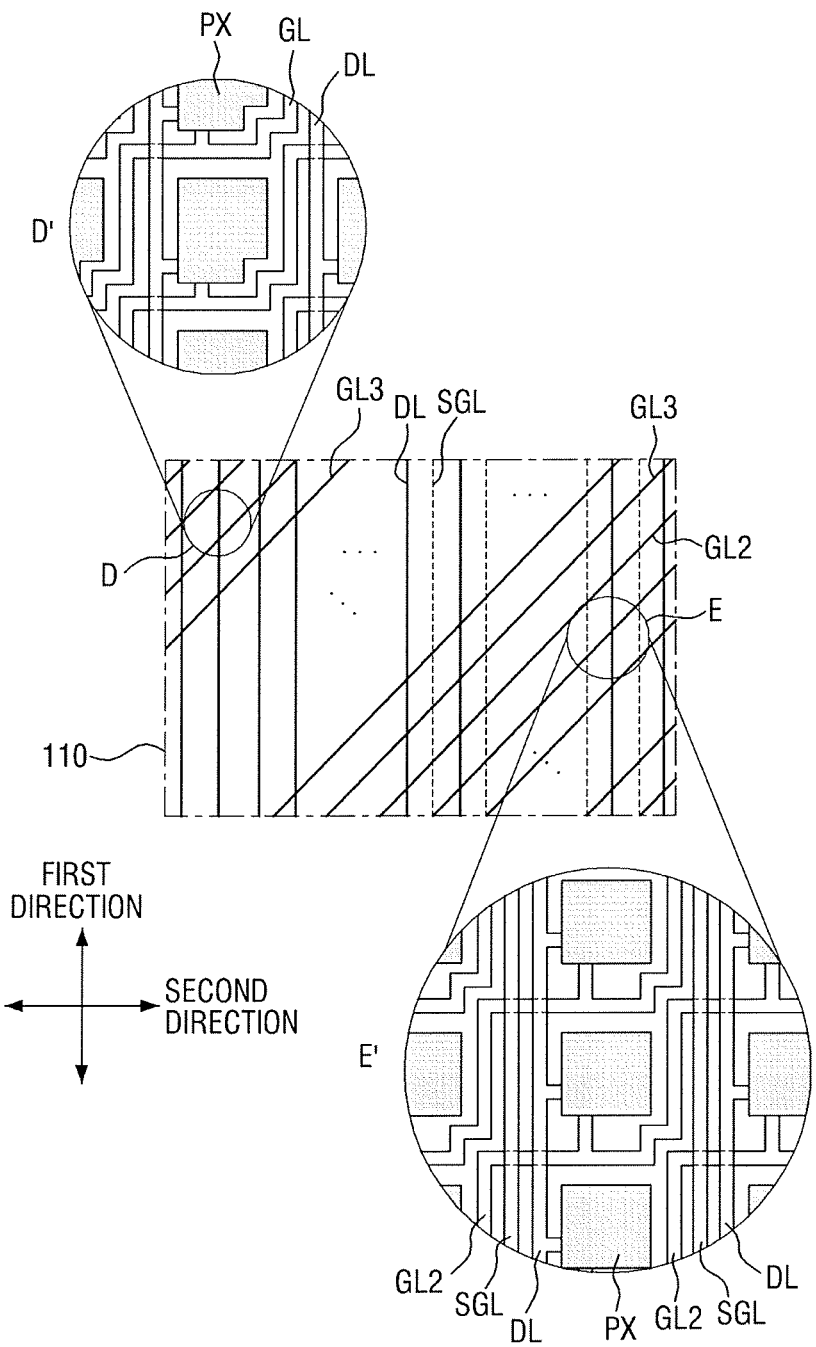
FIG. 5 is a schematic diagram of the display unit which does not include a first gate line of the present disclosure.

FIG. 5 is a schematic diagram of the display unit which lacks a first gate line of the present disclosure.

FIG. 5 is the same as FIG. 2 except for illustrated parts that differ from those of FIG. 2, so that the different illustrated parts will be described, and the remaining parts will not be described.

Referring to FIG. 5, the display unit 110 may lack the first gate line GL1 illustrated in FIG. 2, and the gate lines GL2 and GL3 may all extend in the third direction. That is, the display unit 110 may include a second gate line GL2 that extends in the third direction and is electrically connected with the sub gate line SGL, and a third gate line GL3 that extends in the third direction, but is not electrically connected with the sub gate line SGL. In this case, area E that is part of an area in which the sub gate line SGL is formed, may have the same structure as that of area B of FIG. 2, but area D that is part of an area in which no sub gate line SGL is formed, may have a different structure from that of area A of FIG. 2.

In particular, referring to D', which shows an enlarged area D, no sub gate line SGL is formed, unlike area E. However, the remaining structures may be the same as those of area E.

In addition, there may be large differences between resistance and capacitance values of a third gate lines GL3 most adjacent to the second gate line GL2, and resistance and capacitance values of a second gate line GL2 most adjacent to the third gate line GL3 and the sub gate line SGL connected with the second gate line GL2, which may generate a luminance deviation, which may influence a display quality of the display device 1000. A detailed description will be provided with reference to FIGS. 6, 7, 8, and 9, below.

Figure 6:
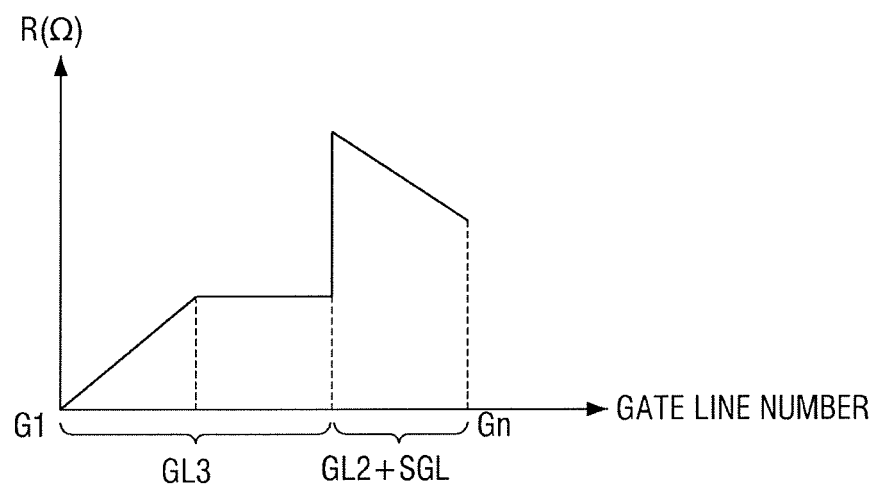
FIG. 6 is a graph of a resistance of a third gate line, and a resistance of a second gate line and a sub gate line of the display unit illustrated in FIG. 5.
Figure 7:
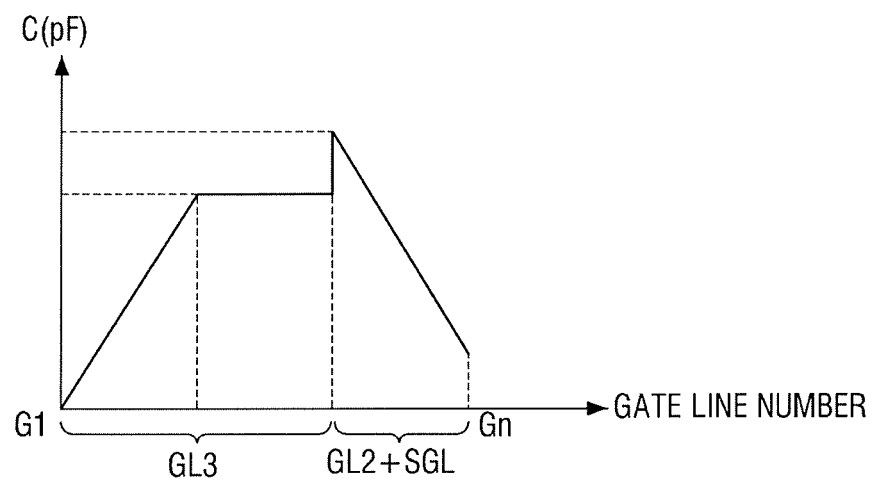
FIG. 7 is a graph of a capacitance of the third gate line, and a capacitance of the second gate line and the sub gate line of the display unit illustrated in FIG. 5.
Figure 8:
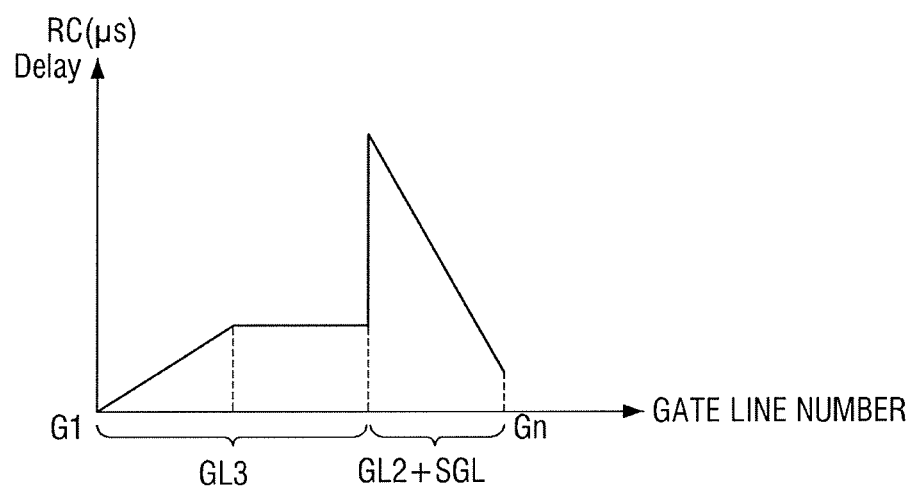
FIG. 8 is a graph of an RC delay of the third gate line, and an RC delay of the second gate line and the sub gate line of the display unit illustrated in FIG. 5.
Figure 9:
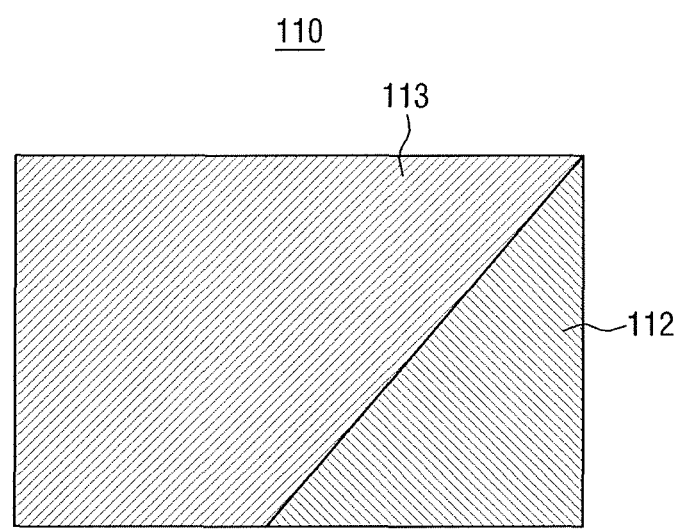
FIG. 9 is a schematic diagram of a luminance deviation in the display device that includes the display unit illustrated in FIG. 5.

FIG. 6 is a graph of a resistance of the third gate line, and a resistance of the second gate line and the sub gate line of the display unit illustrated in FIG. 5. FIG. 7 is a graph of a capacitance of the third gate line, and a capacitance of the second gate line and the sub gate line of the display unit illustrated in FIG. 5. FIG. 8 is a graph of an RC delay of the third gate line, and an RC delay of the second gate line and the sub gate line of the display unit illustrated in FIG. 5. FIG. 9 is a schematic diagram of a luminance deviation exhibited in the display device that includes the display unit illustrated in FIG. 5.

Referring to FIGS. 6, 7, and 8, it can be seen that there are differences in resistance and capacitance values between the adjacent second gate line GL2 and third gate line GL3, and thus, there is a difference in an RC delay calculated from the resistance and capacitance values.

Accordingly, as illustrated in FIG. 9, a luminance deviation may be viewed at a boundary of a second gate line area 112, in which pixels receiving the gate signal from the second gate line GL2 are positioned, and a third gate line area 113, in which pixels receiving the gate signal from the third gate line GL3 are positioned. However, the resistance, capacitance, and RC delay value gradually change within each of the second gate line area 112 and the third gate line area 111, so that no luminance deviation may be viewed.

In addition, no display luminance deviation may be viewed in the display unit 110 illustrated in FIG. 2 that includes the first gate line GL1. This will be described in detail with reference to FIGS. 10, 11, and 12.

Figure 10:
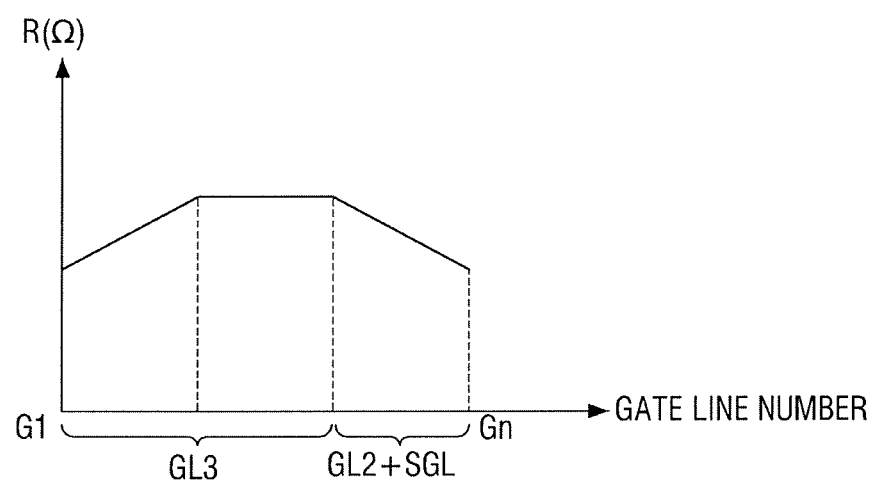
FIG. 10 is a graph of a resistance of a first gate line, and a resistance of a second gate line and a sub gate line of the display unit illustrated in FIG. 2.
Figure 11:
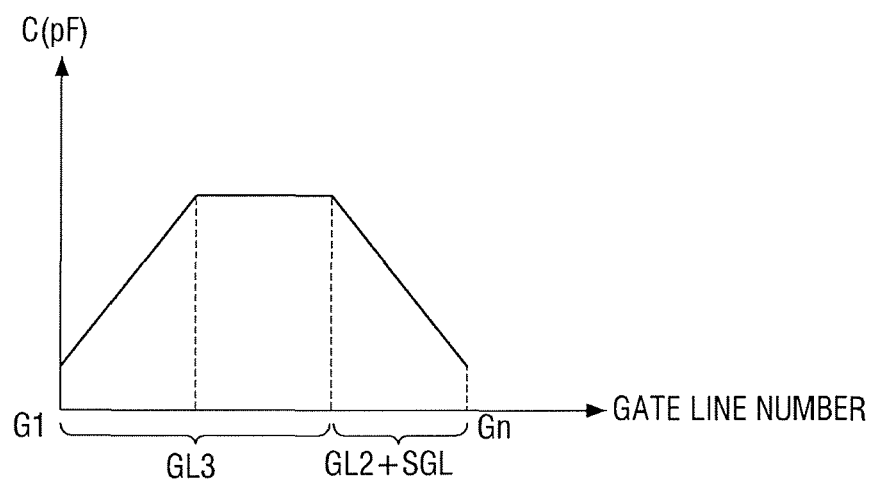
FIG. 11 is a graph of a capacitance of the first gate line, and a capacitance of the second gate line and the sub gate line of the display unit illustrated in FIG. 2.
Figure 12:
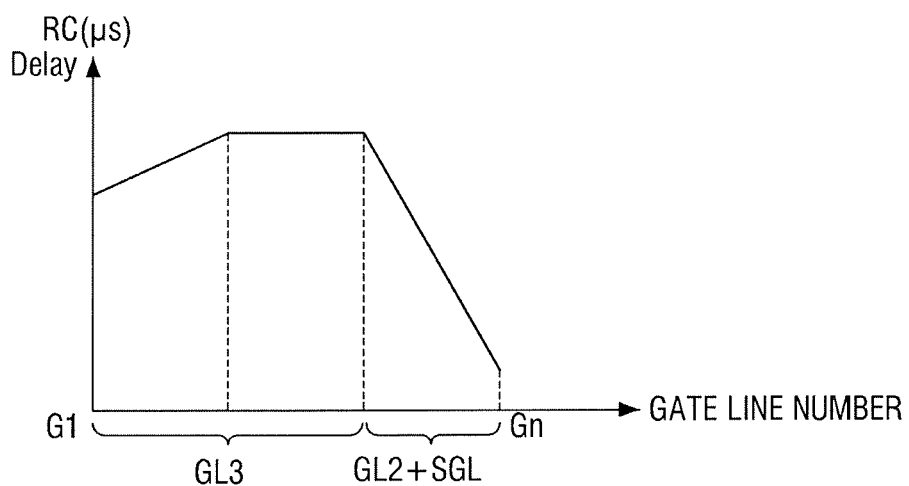
FIG. 12 is a graph of an RC delay of the first gate line, and an RC delay of the second gate line and the sub gate line of the display unit illustrated in FIG. 2.

FIG. 10 is a graph of a resistance of the first gate line, and a resistance of the second gate line and the sub gate line of the display unit illustrated in FIG. 2. FIG. 11 is a graph of a capacitance of the first gate line, and a capacitance of the second gate line and the sub gate line of the display unit illustrated in FIG. 2. FIG. 12 is a graph of an RC delay of the first gate line, and an RC delay of the second gate line and the sub gate line of the display unit illustrated in FIG. 2.

Referring to FIGS. 10, 11, and 12, it can be seen that differences in the resistance and capacitance values between the first gate line GL1 and an adjacent second gate line GL2 are not large, and that the resistance and the capacitance values gradually change. Further, it may be seen that the RC delay is also gradually changed by the gradual changes in the resistance and capacitance values. Accordingly, no luminance deviation in FIG. 9 may be viewed.

To this end, as described with reference to FIG. 2, a point where the resistance of the adjacent first gate lines GL1 is equal to the resistance of the second gate line GL2 and the sub gate line SGL may be set as the area boundary line 111.

Figure 13:
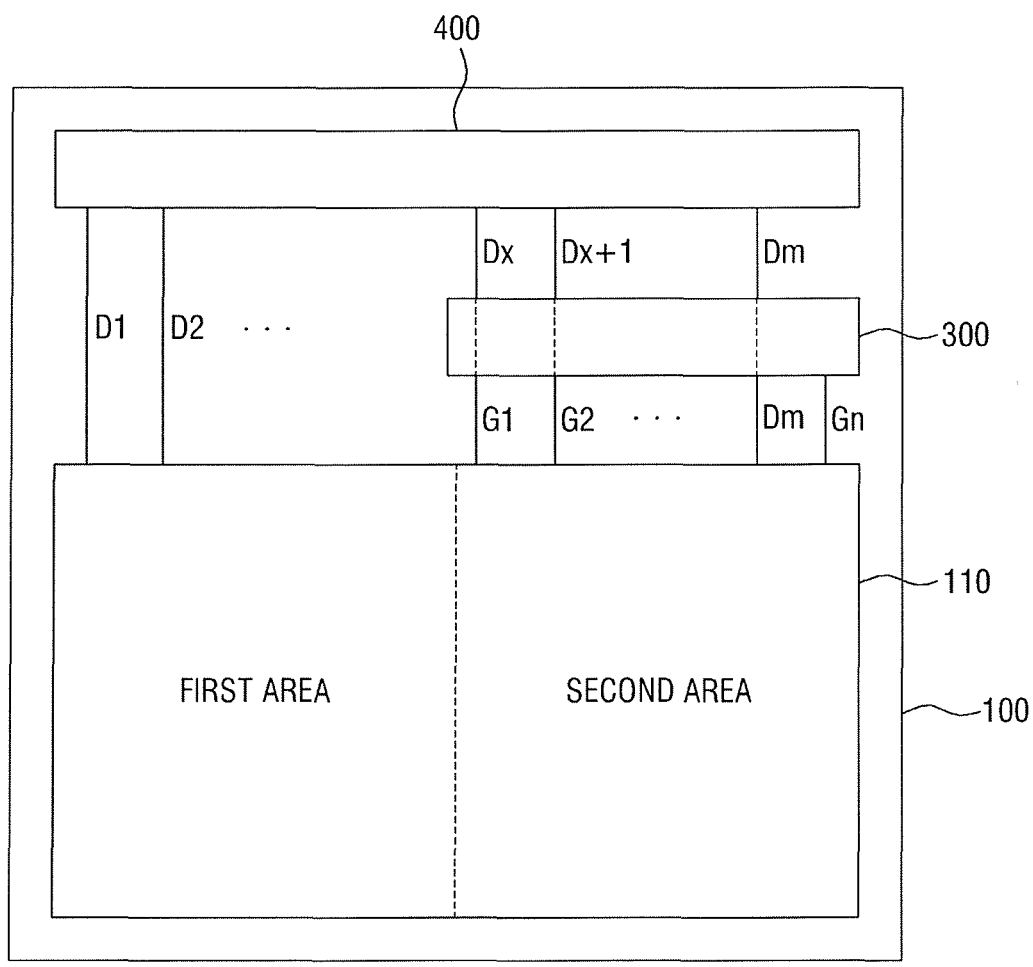
FIG. 13 is a schematic diagram of a display panel that uses a gate line structure of the display unit illustrated in FIG. 2.
Figure 14:
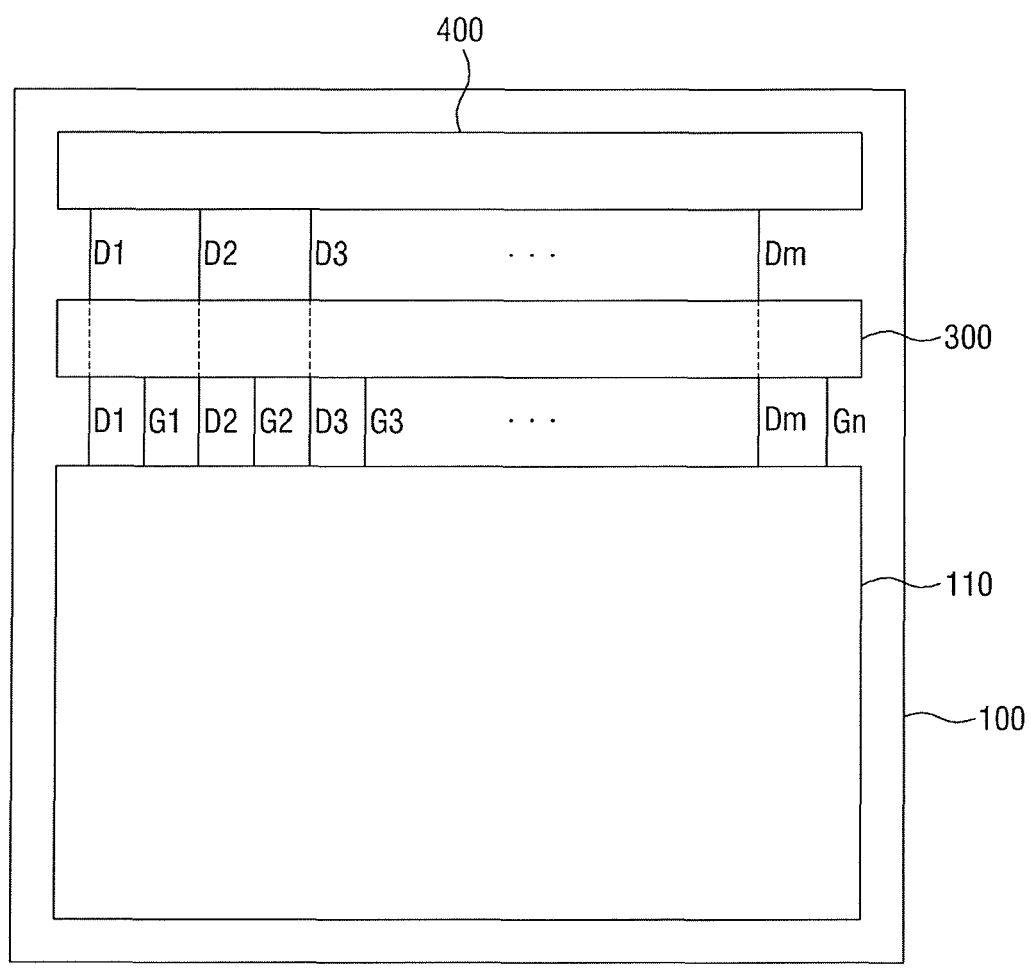
FIG. 14 is a schematic diagram of a display panel that uses a gate line structure of the display unit illustrated in FIG. 5.

FIG. 13 is a schematic diagram of a display panel that uses a gate line structure of the display unit illustrated in FIG. 2, and FIG. 14 is a schematic diagram of a display panel that uses a gate line structure of the display unit illustrated in FIG. 5.

Referring to FIGS. 13 and 14, when the gate line disposition structure of the display unit 110 illustrated in FIG. 2 is used, it is possible to decrease an area of the gate driver 300, and decrease the number of integrated circuits and stages used to form the gate driver 300, compared to the case when the gate line disposition structure of the display unit 110 illustrated in FIG. 5 is used.

In particular, while the gate driver 300 illustrated in FIG. 13 is disposed in an area outside of a right upper corner of the display unit 110, the gate driver 300 illustrated in FIG. 14 may be disposed in an entire upper area outside of the display unit 110.

Thus, according to the gate driver 300 illustrated in FIG. 13, it is possible to decrease manufacturing time and costs compared to the case of manufacturing a display device 1000 that includes the gate driver 300 illustrated in FIG. 14. Further, it is possible to decrease the number of gate signals necessary for driving one frame. Accordingly, a display quality may be further improved by decreasing a time necessary for displaying one frame or increasing a period of one pulse of the gate signal.

This will be described in detail with reference to FIGS. 15 and 16.

Figure 15:
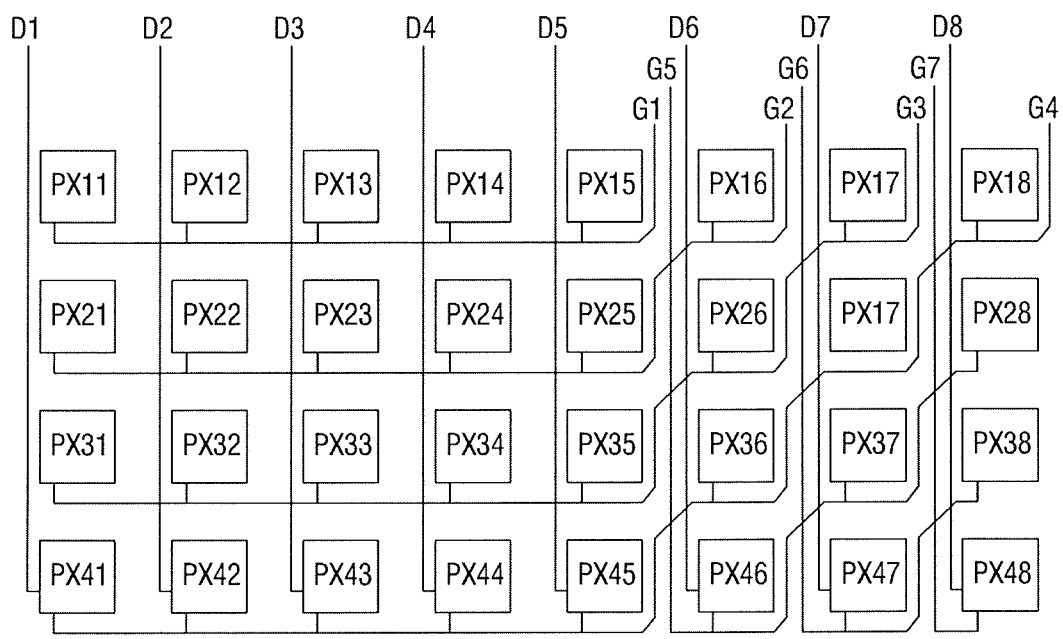
FIG. 15 is a circuit diagram of an embodiment of the display unit illustrated in FIG. 13.
Figure 16:
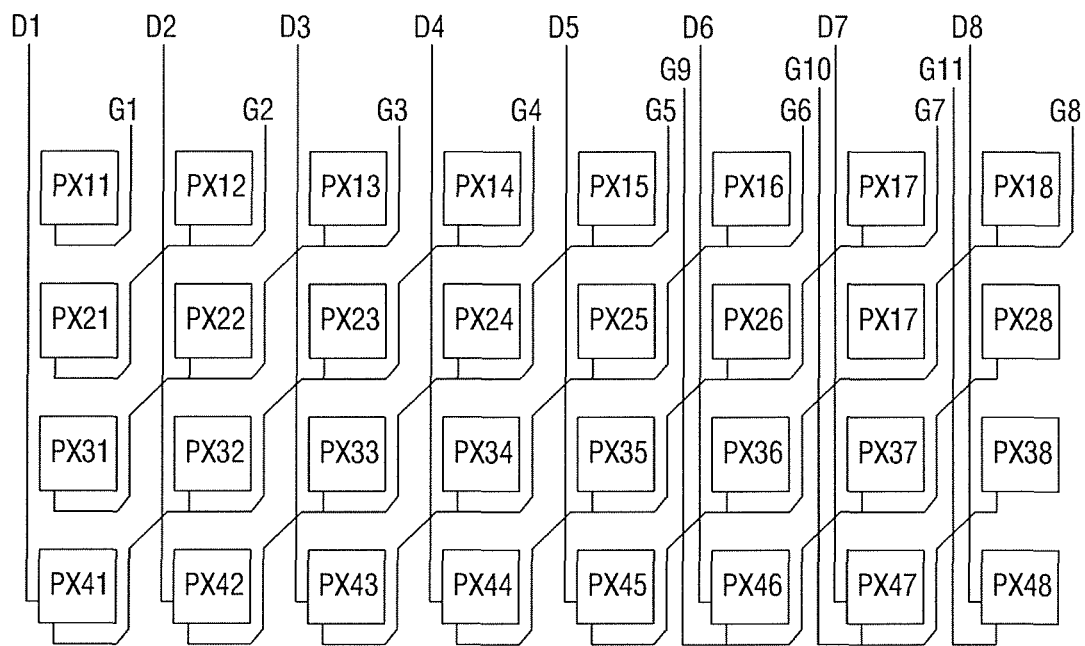
FIG. 16 is a circuit diagram of an embodiment of the display unit illustrated in FIG. 14.

FIG. 15 is a circuit diagram of an embodiment of the display unit illustrated in FIG. 13, and FIG. 16 is a circuit diagram of an embodiment of the display unit illustrated in FIG. 14.

The display units 110 illustrated in FIGS. 15 and 16 each include a total of 32 pixels PX11 to PX48 having four lines in a row direction and eight lines in a column direction. The number of pixels PX11 to PX48 is illustrative and not limited thereto, and the display unit 110 may include more or fewer pixels PXs.

Referring to FIG. 15, the number of data lines D1 to D8 used to provide the data signal to all 32 pixels PX11 to PX48 is 8, and the number of gate lines G1 to G7 used to provide the gate signal to all 32 pixels PX11 to PX48 is 7.

Referring to FIG. 16, the number of data lines D1 to D8 used to provide the data signal to all 32 pixels PX11 to PX48 is 8, which is the same as that illustrated in FIG. 15. However, the number of gate lines G1 to G11 used to provide the gate signal is 11, which is greater than the number of gate lines f the display unit 110 illustrated in FIG. 15.

Figure 17:
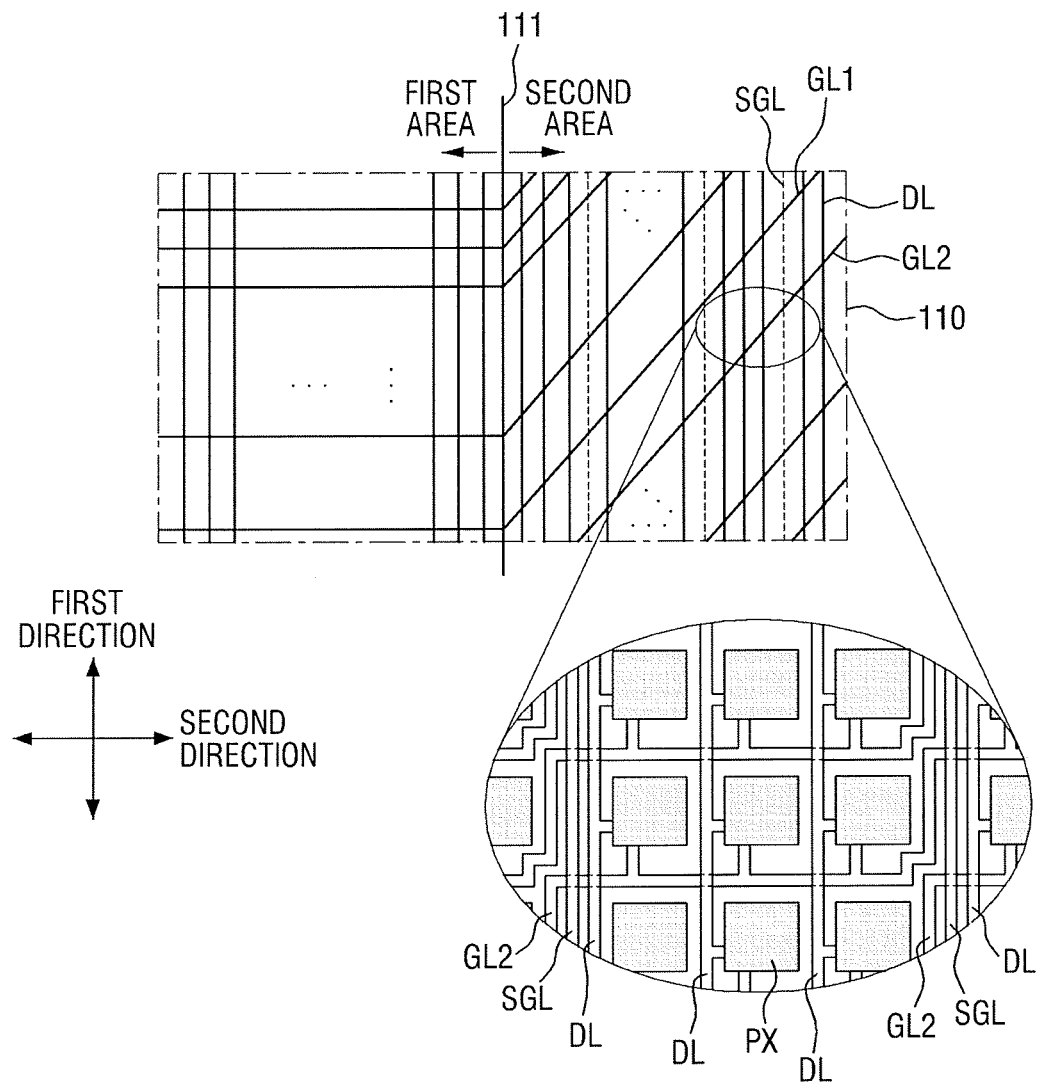
FIG. 17 is a schematic diagram of a display unit according to another embodiment of the present disclosure.

FIG. 17 is a schematic diagram of a display unit according to another embodiment of the present disclosure.

FIG. 17 is the same as FIG. 2 except for illustrated parts that differ from those of FIG. 2, so that the different illustrated parts will be described, and the remaining parts will not be described.

Referring to FIG. 17, all data lines DL and sub gate lines SGL may extend in a first direction, but, unlike FIG. 2, one sub gate line SGL may be disposed for every three data lines DL, as shown in the enlarged section. In addition, an inclination angle of a third direction inclined with respect to the first direction and the second direction may differ from that of FIG. 2. Further, the disposition is not limited thereto, and the number of data lines DL for every sub gate line SGL may change, and the data lines DL may be irregularly disposed.

Figure 18:
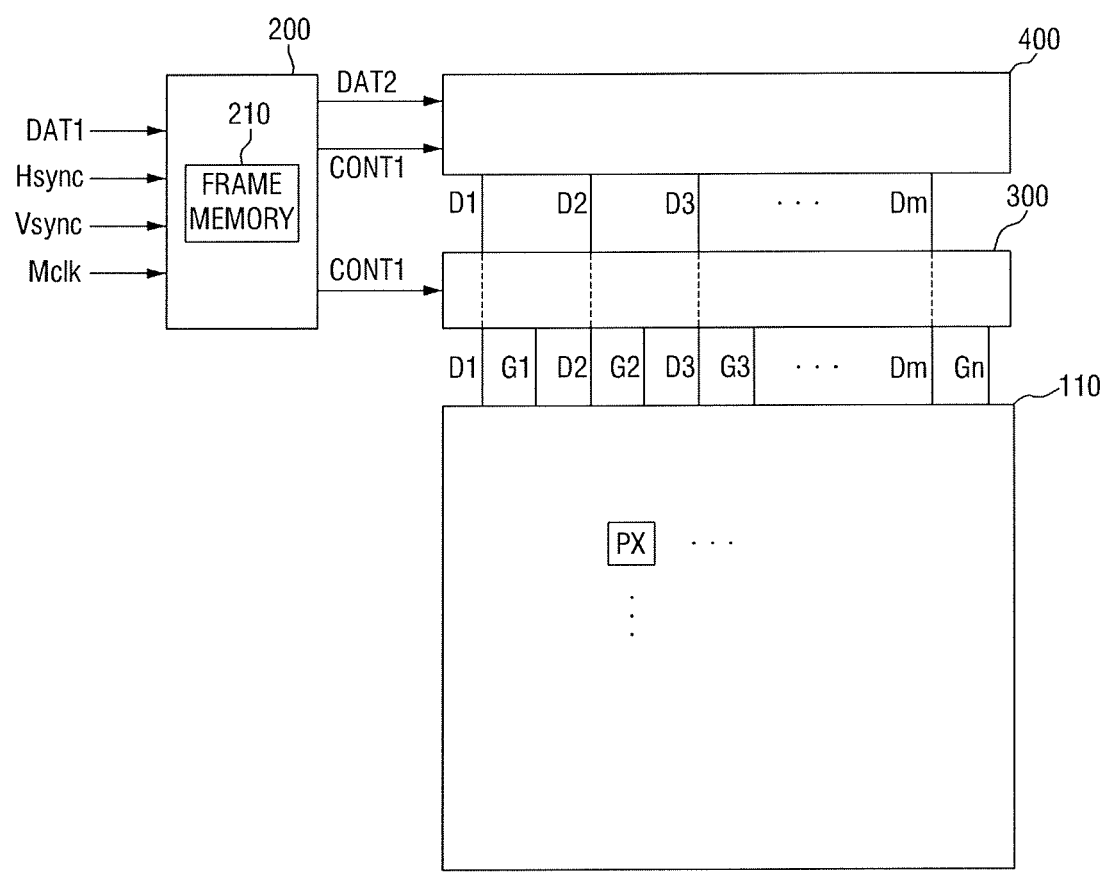
FIG. 18 is a schematic diagram of a display device according to another embodiment of the present disclosure.

FIG. 18 is a schematic diagram of a display device according to another embodiment of the present disclosure.

FIG. 18 is the same as FIG. 1 except for illustrated parts that differ from those of FIG. 1, so that the different illustrated parts will be described, and the remaining parts will not be described.

Referring to FIG. 18, a signal controller 200 may further include a frame memory 210. As described above, the signal controller 200 may process first image data DAT1 to yield second image data DAT2 in accordance with operating conditions of the data driver 400 based on an input control signal. The frame memory 210 illustrated in FIG. 18 may align second image data DAT2 with an order in which the gate signals are provided to each pixel.

This will be described in detail with reference back to FIG. 15.

In general, the plurality of gate lines are horizontally disposed, so that the gate lines sequentially provide a data signal row-by-row from the first row to the last row of pixels, thereby displaying an image. In particular, in a first mode of operation of the gate driver 300, on-level gate signals are provided to any one of the plurality of first gate lines and the plurality of second gate lines.

However, referring to FIG. 15, in a second mode of operation of the gate driver 300, the data signal and the gate signal may be provided in a different order. In particular, when an on-level gate signal is provided to the first gate line G1, the data signal is provided to data lines D1 to D5 of the first to fifth columns, and thus the data signal may be provided to pixels PX11 to PX15 of the first row and first column to the first row and fifth column.

Next, when an on-level gate signal is provided to the second gate line G2, the data signal is provided to data lines D1 to D6 of the first to sixth columns, and thus the data signal may be provided to pixels PX21 to PX25 of the second row and first column to the second row and fifth column, and pixel PX16 of the first row and sixth column.

Next, when an on-level gate signal is provided to the third gate line G3, the data signal is provided to data lines D1 to D7 of the first to seventh columns, and thus the data signal may be provided to pixels PX31 to PX35 of the third row and first column to the third row and fifth column, pixel PX26 of the second row and sixth column, and pixel PX17 of the first row and seventh column.

Next, when an on-level gate signal is provided to the fourth gate line G4, the data signal is provided to data lines D1 to D8 of the first to eighth columns, and thus the data signal may be provided to pixels PX41 to PX45 of the fourth row and first column to the fourth row and fifth column, pixel PX36 of the third row and sixth column, the pixel PX27 of the second row and seventh column, and pixel PX18 of the first row and eighth column.

Next, when an on-level gate signal is provided to the fifth gate line G5, the data signal is provided to data lines D6 to D8 of the sixth to eighth columns, and thus the data signal may be provided to pixel PX46 of the fourth row and sixth column, pixel PX37 of the third row and seventh column, and pixel PX28 of the second row and eighth column.

Next, when an on-level gate signal is provided to the sixth gate line G6, the data signal is provided to data lines D7 and D8 of the seventh and eighth columns, and thus the data signal may be provided to pixel PX47 of the fourth row and seventh column and pixel PX38 of the third row and eighth column.

Next, when an on-level gate signal is provided to the seventh gate line G7, the data signal is provided to data line D8 of the eighth column, and thus the data signal may be provided to pixel PX48 of the fourth row and eighth column.

Accordingly, the frame memory 210 illustrated in FIG. 18 may control a data writing order of the second image data DAT2 provided to the data driver 400 to sequentially include gray levels for pixels PX11 to PX15 of the first row and first column to the first row and fifth column, gray levels for pixels PX21 to PX25 of the second row and first column to the second row and fifth column and pixel PX16 of the first row and sixth column, gray levels for pixels PX31 to PX35 of the third row and first column to the third row and fifth column, pixel PX 26 of the second row and sixth column, and pixel PX17 of the first row and seventh column, gray levels for pixels PX41 to PX45 of the fourth row and first column to the fourth row and fifth column, pixel PX36 of the third row and sixth column, pixel PX27 of the second row and seventh column, and pixel PX18 of the first row and eighth column, gray levels for pixel PX46 of the fourth row and sixth column, pixel PX37 of the third row and seventh column, and pixel PX28 of the second row and eighth column, gray levels for pixel PX47 of the fourth row and seventh column and pixel PX38 of the third row and eighth column, and gray levels for pixel PX48 of the fourth row and eighth column. Further, the order is not limited thereto, and the frame memory 210 may write data in a different order according to the disposition structure of the gate lines G1 to G7 or the data lines D1 to D8.

In addition, some of the gate signals may be simultaneously provided according to the structure of the gate lines G1 to G7 disposed on the display unit 110. In particular, when an on-level gate signal is provided to the first gate line G1, the on-level gate signal may be provided to pixels PX11 to PX15 of the first row and first column to the first row and fifth column. Accordingly, the data signal may be provided to data lines D1 to D5 of the first to fifth columns. In this case, when the on-level gate signal is simultaneously provided to the fifth gate line G5, the gate signal provided to the gate line G5 is provided to pixel PX46 of the fourth row and sixth column, pixel PX37 of the third row and seventh column, and pixel PX28 of the second row and eighth column, so that the data signal may also be provided to data lines D6 to D8 of the sixth to eighth columns, thereby efficiently providing the data signal without the data line.

Similarly, when an on-level gate signal is provided to the second gate line G2, the gate signal is provided to pixels PX21 to PX25 of the second row and first column to the second row and fifth column, and pixel PX16 of the first row and sixth column, and thus the data signal may be provided to data lines D1 to D6 of the first to sixth columns. In this case, when the on-level gate signal is simultaneously provided to the sixth gate line G6, the gate signal provided through the sixth gate line G6 is provided to pixel PX47 of the fourth row and seventh column and pixel PX38 of the third row and eighth column, so that the data signal may be provided even to the data lines D7 and D8 of the seventh and eighth columns.

However, when an on-level gate signal is provided to the fourth gate line G4, the gate signal is provided to pixels PX41 to PX45 of the fourth row and first column to the fourth row and fifth column, pixel PX36 of the third row and sixth column, pixel PX27 of the second row and seventh column, and pixel PX18 of the first row and eighth column, so that the data signal may be provided to all of the data lines D1 to D8 of the first to eighth columns, and thus it may not be necessary to simultaneously provide an on-level gate signal to another gate line. That is, the gate driver 300 may be operated to provide an on-level gate signal to the plurality of gate lines, and provide an on-level gate signal to one gate line.

The foregoing is illustrative of embodiments of the present disclosure and is not to be construed as limiting thereof. Although a few exemplary embodiments of the present disclosure have been described, those skilled in the art will readily appreciate that many modifications are possible in the exemplary embodiments without materially departing from the novel teachings of the present disclosure. Accordingly, all such modifications are intended to be included within the scope of the present disclosure as defined in the claims. Therefore, it is to be understood that the foregoing is illustrative of the present disclosure and is not to be construed as limited to the exemplary embodiments disclosed, and that modifications to the disclosed embodiments, as well as other embodiments, are intended to be included within the scope of the appended claims. The present disclosure is defined by the following claims, with equivalents of the claims to be included therein.

What is claimed is:

1. A display panel, comprising:
   a display unit that includes a first area and a second area;
   first gate lines formed over the first area and the second area that extend in a second direction in the first area and extend in a third direction in the second area, while first sections thereof extending in a first direction and second sections thereof extending in a second direction are repeated;
   second gate lines formed over the second area but not the first area that extend in the third direction while first sections thereof extending in the first direction and second sections thereof extending in the second direction are repeated, and
   sub gate lines that extend in the first direction in the second area,
   wherein one end of each sub gate line is connected to one end of each second gate line,
   wherein the second direction is a direction perpendicular to the first direction, and
   wherein the third direction is a direction inclined with respect to the first direction and the second direction.

2. The display panel of claim 1, wherein a resistance of a first gate line most adjacent to the second gate line is equal to a resistance of one of the second gate lines most adjacent to the first gate line and the sub gate line connected to the one second gate line.

3. The display panel of claim 1, wherein a length of a first gate lines adjacent to the second gate line is equal to a length of one of the second gate lines most adjacent to the first gate line and the sub gate line connected to the one second gate line.

4. The display panel of claim 1, further comprising
   data lines formed in the first area and the second area that extend in the first direction; and
   a plurality of pixels disposed where the data lines and the first gate lines cross, and where the data lines and the second gate lines cross,
   wherein the data line is formed on a different layer from that of the first gate line and the second gate line and is spaced apart from the first gate line and the second gate line by an insulation layer interposed therebetween, and
   the sub gate line is formed on the same layer as the data line.

5. The display panel of claim 4, wherein the sub gate line is electrically connected with the second gate line through a contact hole that passes through the insulation layer.

6. The display panel of claim 4, wherein sections of the second gate lines extending in the second direction cross the plurality of data lines, and the second gate lines are connected to the plurality of pixels.

7. A display device, comprising:
   a first area and a second area;
   data lines formed in the first area and the second area that extend in a first direction;
   first gate lines formed over the first area and the second area that extend in a second direction in the first area, and extend in a third direction in the second area while first sections thereof extending in the first direction and second sections thereof extending in the second direction are repeated;
   second gate lines formed over the second area but not the first area that extend in the third direction while first sections thereof extending in the first direction and second sections thereof extending in the second direction are repeated; and
   a display unit that includes a plurality of pixels disposed where the data lines and the first gate lines cross, and where the data lines and the second gate lines cross,
   wherein the second direction is a direction perpendicular to the first direction, and
   the third direction is a direction inclined with respect to the first direction and the second direction.

8. The display device of claim 7, further comprising, sub gate lines that extend in the first direction in the second area, and
   wherein one end of each sub gate line is connected to one end of each second gate line, and
   the gate signal provided to the second gate line is provided through the sub gate lines.

9. The display device of claim 8, wherein a resistance of a first gate line most adjacent to the second gate line is equal to a resistance of one of the second gate lines most adjacent to the first gate line and the sub gate line connected to the one second gate line.

10. The display device of claim 8, wherein a length of a first gate lines most adjacent to the second gate line is equal to a length of one of the second gate lines most adjacent to the first gate line and the sub gate line connected to the one second gate line.

11. The display device of claim 8, wherein the data lines are formed on a different layer from that of the first gate lines and the second gate lines and are spaced apart from the first gate lines and the second gate lines by an insulation layer interposed therebetween, and the sub gate lines are formed on the same layer of the data lines.

12. The display device of claim 11, wherein the sub gate line is electrically connected to the second gate line through a contact hole that passes through the insulation layer.

13. The display device of claim 7, wherein sections of the second gate lines extending in the second direction cross the plurality of data lines.

14. The display device of claim 7, further comprising:
a data driver configured to provide a data signal to the plurality of data lines;
a gate driver configured to provide a gate signal to the plurality of first gate lines and the plurality of second gate lines; and
a signal controller configured to control the data driver and the gate driver.

15. The display device of claim 14, wherein the data driver and the gate driver are disposed in an area outside of one of a plurality of corners of the display unit.

16. The display device of claim 15, wherein the gate driver is disposed in an area that is smaller than an area in which the data driver is disposed.

17. The display device of claim 14, wherein the signal controller further includes a frame memory, and the frame memory aligns image data provided to the data driver based on an order in which gate signals are provided to the plurality of pixels.

18. The display device of claim 14, wherein the gate driver has two modes of operation, a first mode, in which on-level gate signals are provided to any one of the plurality of first gate lines and the plurality of second gate lines, and a second mode in which an on-level gate signal is simultaneously provided to at least one of the plurality of first gate lines and at least one of the plurality of second gate lines.

19. The display device of claim 18, wherein when the gate driver is operated in the second mode, the plurality of pixels, to which the one-level gate signal is provided, receives the data signal from different respective data lines.

* * * * *